United States Patent
Lin et al.

(10) Patent No.: US 6,639,553 B2
(45) Date of Patent: *Oct. 28, 2003

(54) PASSIVE/RANGING/TRACKING PROCESSING METHOD FOR COLLISION AVOIDANCE GUIDANCE

(76) Inventors: Ching-Fang Lin, 888 Easy St., Simi Valley, CA (US) 93065; Dong An, 888 Easy St., Simi Valley, CA (US) 93065

(*) Notice: Subject to any disclaimer, the term of this patent is extended or adjusted under 35 U.S.C. 154(b) by 0 days.

This patent is subject to a terminal disclaimer.

(21) Appl. No.: 10/194,500

(22) Filed: Jul. 13, 2002

(65) Prior Publication Data

US 2003/0146869 A1 Aug. 7, 2003

Related U.S. Application Data

(62) Division of application No. 09/841,403, filed on Apr. 23, 2001, now Pat. No. 6,489,922.
(60) Provisional application No. 60/199,052, filed on Apr. 22, 2000.

(51) Int. Cl.[7] .............................. G01S 3/02; G01S 5/14
(52) U.S. Cl. .................. 342/444; 342/357.14; 342/458
(58) Field of Search ...................... 342/357.14, 357.08, 342/444, 458, 465, 418

(56) References Cited

U.S. PATENT DOCUMENTS

| | | | | |
|---|---|---|---|---|
| 3,922,533 A | * | 11/1975 | Royal ........................ 342/442 |
| 4,794,395 A | * | 12/1988 | Cindrich et al. ............. 342/424 |
| 4,954,837 A | * | 9/1990 | Baird et al. ................. 342/458 |
| 5,526,001 A | * | 6/1996 | Rose et al. .................. 342/442 |
| 5,969,676 A | * | 10/1999 | Tran et al. ................... 342/442 |
| 6,169,497 B1 | * | 1/2001 | Robert ........................ 340/988 |
| 6,281,970 B1 | * | 8/2001 | Williams et al. .......... 356/141.4 |
| 6,380,889 B1 | * | 4/2002 | Herrmann et al. ...... 342/357.09 |
| 6,489,922 B1 | * | 12/2002 | Lin et al. ................ 342/357.14 |

* cited by examiner

*Primary Examiner*—Gregory C. Issing
(74) *Attorney, Agent, or Firm*—Raymond Y. Chan; David and Raymond Patent Group

(57) ABSTRACT

A passive/ranging/tracking processing method provides information from passive sensors and associated tracking control devices and GPS/IMU integrated navigation system, so as to produce three dimensional position and velocity information of a target. The passive/ranging/tracking processing method includes the procedure of producing two or more sets of direction measurements of a target with respect to a carrier, such as sets of elevation and azimuth angles, from two or more synchronized sets of passive sensors and associated tracking control devices, installed on different locations of the carrier, computing the range vector measurement of the target with respect to the carrier using the two or more sets of direction measurements, and filtering the range vector measurement to estimate the three-dimensional position and velocity information of the target.

21 Claims, 7 Drawing Sheets

PASSIVE/RANGING/TRACKING PROCESSING METHOD FOR COLLISION AVOIDANCE GUIDANCE

CROSS REFERENCE OF RELATED APPLICATION

This is a divisional application of a non-provisional application, application Ser. No. 09/841,403, filed Apr. 23, 2001, now U.S. Pat. No. 6,489,922, which is a regular application of a provisional application, application Ser. No. 60/199,052, filed on Apr. 22, 2000.

This invention was made with Government support under Contract No. DAAH10-99-C-0009 and Contract No. DAAH10-00-C-0028 awarded by the US Army Aviation Applied Technology Directorate, US Army Aviation and Missile Command, Fort Eustis, Va. 23604-5577. The Government has certain rights in the invention.

BACKGROUND OF THE PRESENT INVENTION

Technical Field

FIELD OF THE PRESENT INVENTION

The present invention relates to a method for ranging/tracking a target, and more particularly to a method for passively ranging/tracking a target, wherein the direction measurements from two or more laterally displaced passive sensors and associated tracking control devices in a carrier and data from a GPS (Global Positioning System)/IMU (Inertial Measurement Unit) integrated navigation system are processed to provide the three dimensional position and velocity information of a moving target.

DESCRIPTION OF RELATED ARTS

Nowadays, there is an increasing demand for real-time autonomous vehicles in wide application areas, such as industry, agriculture, health care, military, space, and underwater. Major performance characterization of the real-time autonomous vehicles depends on guidance and navigation processing and the control architecture.

Navigation concerns account for the optimal integration of information derived from multiple navigation sensors, such as GPS (Global Positioning System) receiver, IMU (Inertial Measurement Unit), etc. The guidance laws are optimally matched to generate the desired trajectory shape, based on the position information of the autonomous vehicle from the navigation subsystem and the position information of targets from the target tracking subsystem, so as to satisfy optimality criteria along different phases of the traversed path. Target acquisition and tracking accounts for the increasing desire for autonomy in system design. Vehicles are often required to sense their environment and tracking targets that are crucial to their navigation profile. Target state estimation is required to provide or predict an accurate target state from partial information and noisy sensor data.

Generally, conventional methods for producing range measurements of a target with respect to a carrier are to employ an active sensor, such as radio or acoustic radar or laser rangefinder sensor. The concept of operation of an active ranging/tracking sensor depends on measurement of the traveling time between the active sensor transmitted signals and target reflected signals.

Passive tracking methods offer significant advantages over active tracking methods. Unlike radar, laser, and other active tracking control devices, passive sensors do not emit out any kind of energy. They only receive target emitted energy and transform it to measurement data. This characteristic makes the passive tracking method an ideal technique in reconnaissance and surveillance applications, for it can detect the target but keep itself hidden from any external target, as it emits no signals.

However, in general, a passive tracking sensor can not measure the distance between the target and the sensor, as it is not based on the echoed-signal principle. The passive sensor devices offer only the measurement of the target direction with respect to the carrier in space. Therefore, it is very challenging to estimate the highly accurate three-dimensional position and velocity of a target from standalone passive sensors, under target uncertainties, poorly modeled dynamics, perturbations, nonlinear, and time-varying parameters.

SUMMARY OF THE PRESENT INVENTION

The main objective of the invention is to provide a passive/ranging/tracking method, which can provide the three dimensional position and velocity information of a moving target through the information from passive sensors and associated tracking control devices and GPS/IMU integrated navigation system.

Another objective of the invention is to provide a passive/ranging/tracking method, wherein the passive pointing direction measurements of a moving target from two or more laterally displaced synchronized passive sensors are used to triangulate to determinate range measurements. The range measurements are further filtered to provide the three dimensional position and velocity information of the moving target.

Another objective of the invention is to provide a passive/ranging/tracking method, wherein the pair of passive direction measurements of a moving target derived from two or more laterally displaced synchronized passive image sensors is used to triangulate to determinate range measurements. The range measurements are further filtered to provide the position and velocity information of the moving target.

Another objective of the invention is to provide a passive/ranging/tracking method, wherein the position, velocity, and attitude information from an onboard integrated GPS/IMU navigation system are incorporated to provide high accuracy position and attitude information of the carrier to facilitate the passive/ranging/tracking computation.

Another objective of the invention is to provide a passive/ranging/tracking method, wherein a least squares method is employed in the construction of the algorithm of the passive/ranging/tracking to obtain a form of optimal estimation.

Another objective of the invention is to provide a passive/ranging/tracking method, wherein an optimization method is employed in the construction of the algorithm of the passive/ranging/tracking to obtain a form of optimal estimation.

Another objective of the invention is to provide a passive/ranging/tracking method, wherein a nonlinear Kalman filter is employed to achieve an effective, numerically convergent, and highly accurate passive/ranging/tracking computation.

In order to accomplish the above objectives, the present invention provides a passive/ranging/tracking method performed on a carrier, which comprises the steps of:

(a) producing two or more sets of direction measurements of said target with respect to a carrier, such as sets of elevation and azimuth angle of said target, from two or more synchronized sets of passive sensors through associated tracking control device, wherein said passive sensors are installed on different locations of said carrier;

(b) producing navigation data of said carrier, including position, velocity, and attitude data, using an onboard navigation system;

(c) computing said target range vector measurement of said target with respect to said carrier using said two or more sets of direction measurements; and (d) extracting said three-dimensional position and velocity information of said target at said current epoch using said target range vector measurement.

DETAIL DESCRIPTION OF THE PREFERRED EMBODIMENTS

The passive/ranging/tracking method of the present invention provides a solution to obtain the three dimensional position and velocity of a target using onboard passive sensors only, wherein information from passive sensors that are controlled by tracking control devices, respectively, and navigation data of a onboard GPS/IMU integrated navigation system are processed to achieve the passive/ranging/tracking solution.

The most common measurements of target tracking systems consist of the range, range rate, azimuth, or elevation angles. In the present invention, the range vector measurement is first obtained from output of a passive sensor array and the associated tracking control device. Then, the three coordinates to specify the position of the target are extracted.

The range vector measurement contains the direction and distance information of the target with respect to a carrier.

Figure 1:
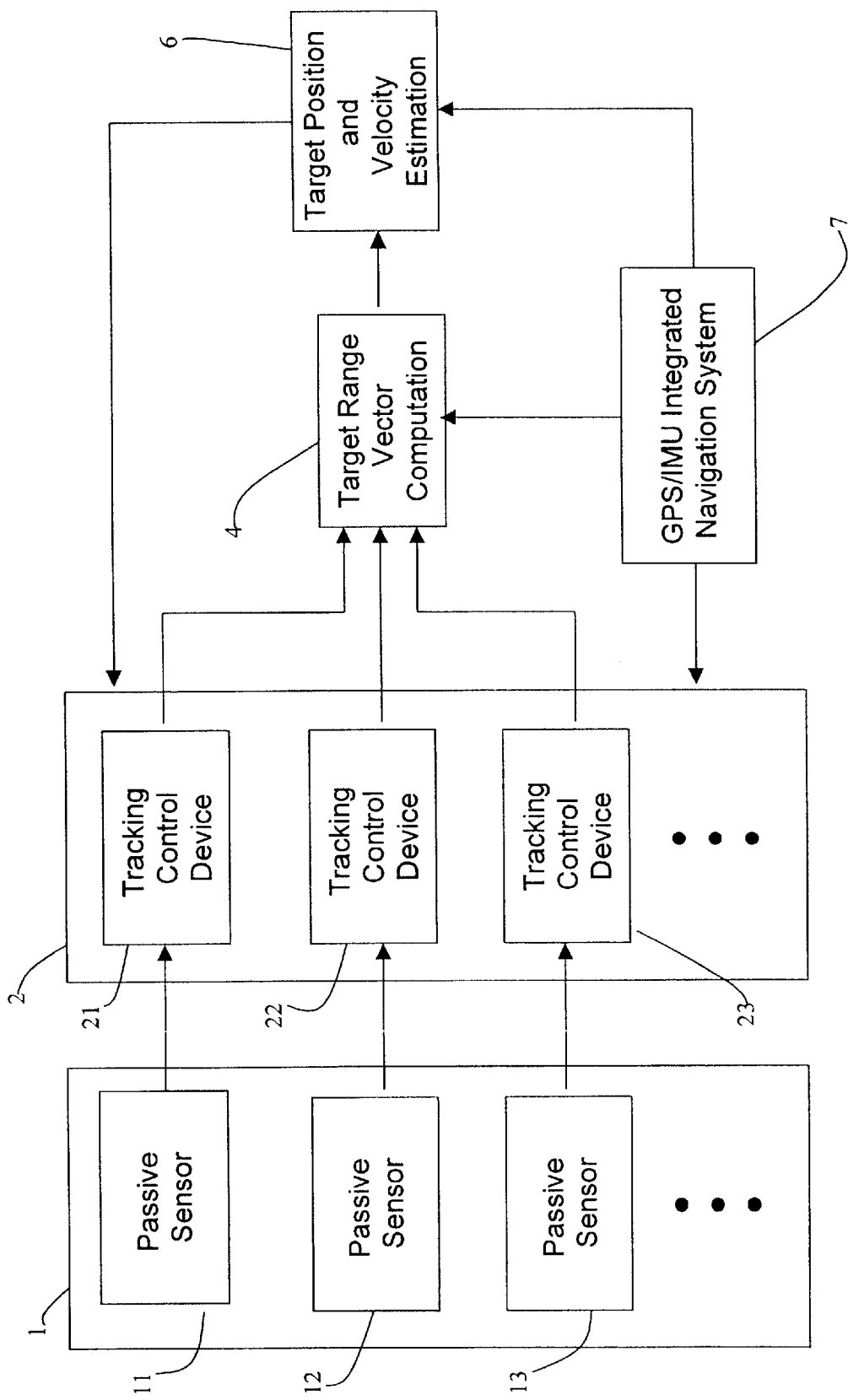
FIG. 1 is a block diagram illustrating a passive/ranging/tracking method according to a preferred embodiment of the present invention.

Referring to FIG. 1, each passive sensor 11, 12, 13 . . . of a passive sensor array 1 receives energy or signals emitted by the target and generates the target direction measurement. Under the control of each tracking control device 21, 22, 23 . . . of a tracking control device array 2, the passive sensors 11, 12, 13 . . . can keep pointing to the target space, so they are capable of giving out accurate direction information of the target. In order to isolate the maneuvering motion of the carrier to keep tracking the target, each of the passive sensors 11, 12, 13 . . . is generally mounted on a two degree-of-freedom observation platform of the respective tracking control device 21, 22, 23 . . . , which is further stabilized by a gyroscope-equipped control system.

For example, each of the tracking control devices 21, 22, 23 . . . may comprise an encoder installed in two gimbal axes to output the precise angular position of the passive sensor direction relative to the body coordinate system of the carrier. But in the computation of the target geographic position, the passive sensor direction relative to the navigation coordinate system is needed, so it is necessary to know the carrier attitude and combine it with the gimbal angles to obtain the angular position of the passive sensor relative to the navigation coordinate system through a target range vector computation 4. The navigation coordinate system can be an East, North and Up coordinate system, or North, East, and Down coordinate system, or North, West and Up coordinate system.

A GPS/IMU integrated navigation system 7 is required to provide accurate position and attitude information of the carrier through a target position and velocity estimation 6.

Figure 2:
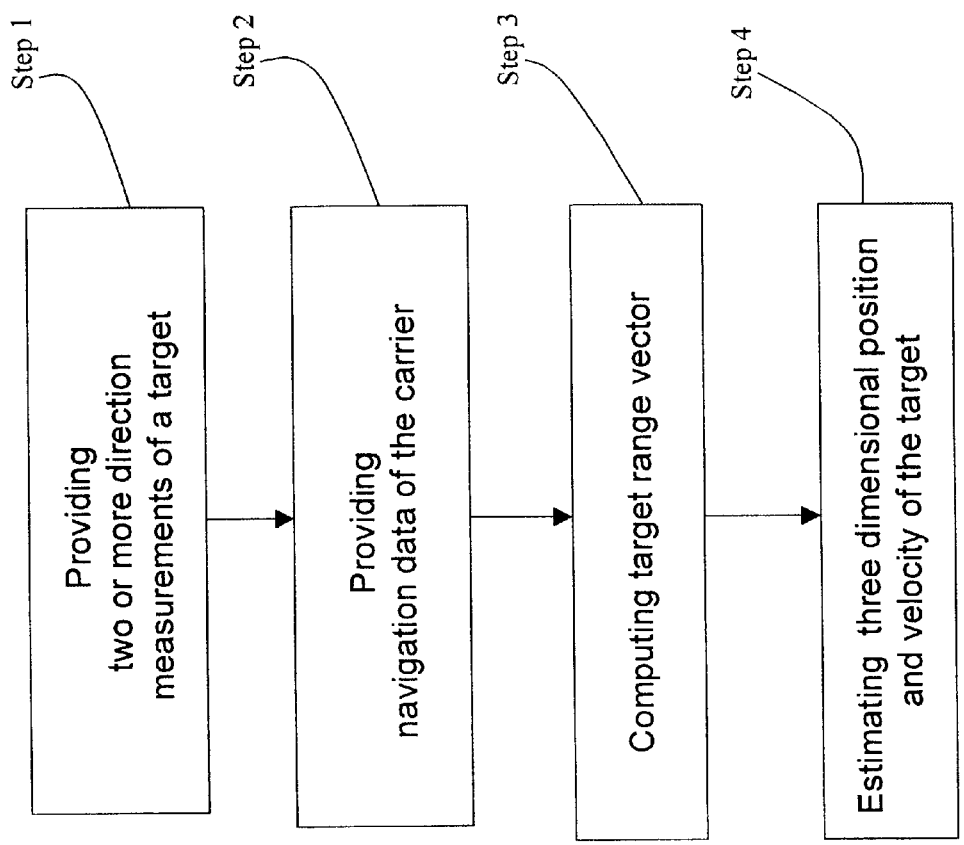
FIG. 2 is a block diagram illustrating the steps of the passive/ranging/tracking method according to the above preferred embodiment of the present invention.

Referring to FIGS. 1 and 2, the passive/ranging/tracking method performed on a carrier for tracking a target comprises the steps of:

(1) producing at least a first set of direction measurements and a second set of direction measurements of the target with respect to the carrier, such as sets of elevation and azimuth angle of the target, from two or more synchronized sets of passive sensors 11, 12, 13 . . . through associated tracking control device 21, 22, 23 . . . , wherein the passive sensors 11, 12, 13 . . . are installed on different locations of the carrier;

(2) producing navigation data of the carrier, including position, velocity, and attitude data, using an onboard navigation system;

(3) computing the target range vector measurement of the target with respect to the carrier using the two or more sets of direction measurements (through the target range vector computation 4 as shown in FIG. 1); and (4) extracting three-dimensional position and velocity information of the target at a current epoch using the target range vector measurement (through the target position and velocity estimation 6 as shown in FIG. 1).

The preferred onboard navigation system is the GPS/IMU integrated navigation system 7, which can provide long-term, highly accurate navigation data of the carrier.

In most applications, two passive sensors 11, 12 are sufficient for the present invention to solve a passive/ranging/tracking problem. A preferred embodiment of the present invention wherein two passive sensors 11, 12 are used is disclosed as follows. Note that the present invention is not limited to the scenario wherein only two passive sensors 11, 12 are used.

As the preferred embodiments, the step (1) further comprises steps of:

(1.1) producing the first set of direction measurements of the target with respect to the carrier, such as elevation and azimuth angle, using the first passive sensor 11 through first tracking control device 21; and (1.2) producing the second set of direction measurements of the target with respect to the carrier, such as elevation and azimuth angle, using the second passive sensor 12 through the second tracking control device 22.

Figure 3:
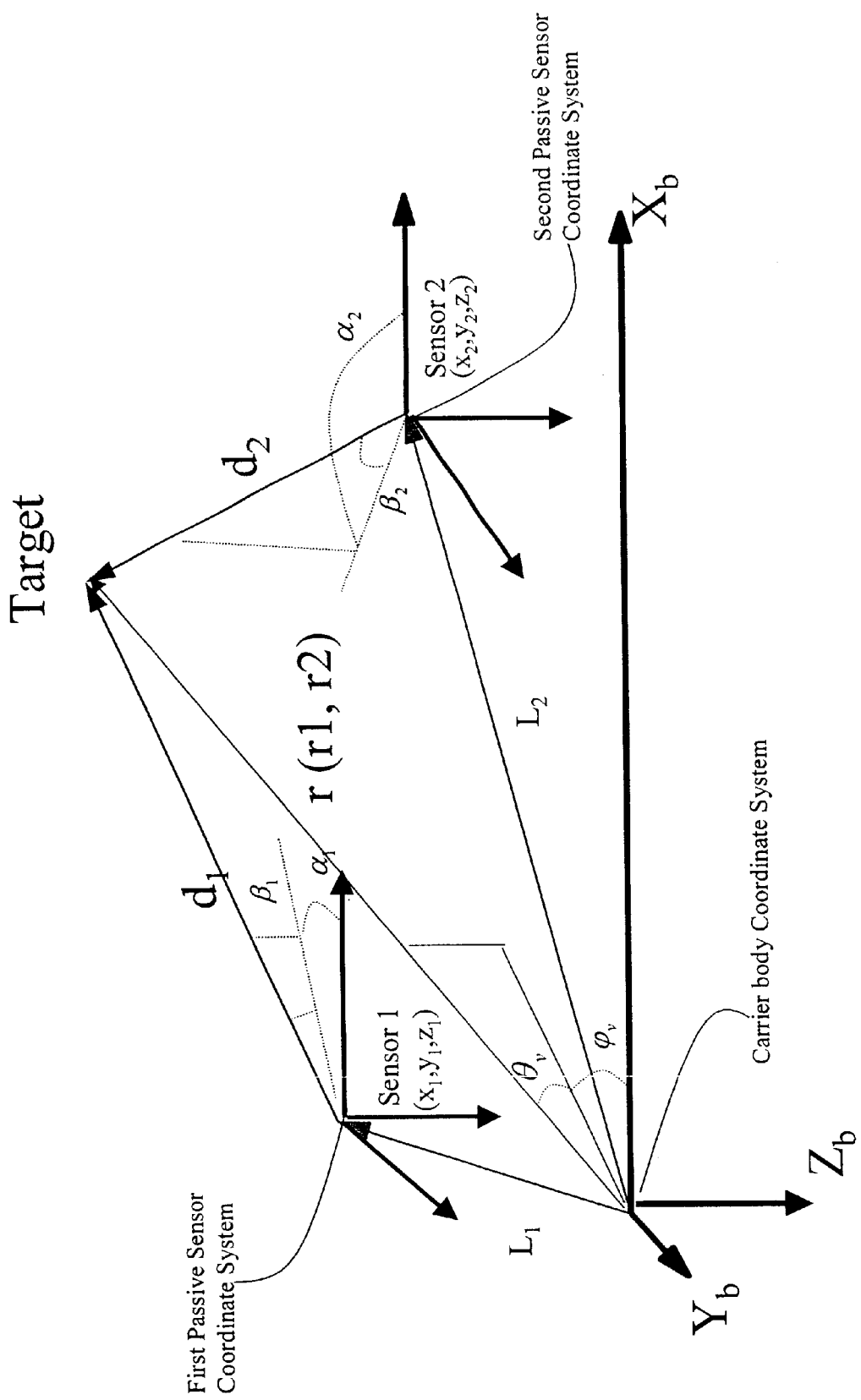
FIG. 3 shows the passive/ranging geometry according to the above preferred embodiment of the present invention.

Referring to FIG. 3, the step (3) further comprises the steps of:

(3.1) forming the first presumed target-sensor vector d1, representing a direction measurement between the first passive sensor 11 and the target and expressed in the first passive sensor coordinate system (x1,y1,z1), using the elevation angle and azimuth angle measurement of the target from output of the first passive sensor 11 and the first unknown distance between the first passive sensor 11 and the target;

(3.2) forming the second presumed target-sensor vector d2, representing a direction measurement between the second passive sensor 12 and the target and expressed in the second passive sensor coordinate system (x2,y2, z2), using the second elevation angle and azimuth angle measurement of the target from the output from the second passive sensor 12 and the second unknown distance between the second passive sensor 12 and the target;

(3.3) converting the first presumed target-sensor vector d1 from the first passive sensor coordinate system (x1,y1, z1) to a navigation coordinate system of the carrier, using navigation data from the GPS/IMU integrated navigation system 7;

(3.4) converting the second presumed target-sensor vector d2 from the second passive sensor coordinate system (x2,y2,z2) to the navigation coordinate system of the carrier, using navigation data from the GPS/IMU integrated navigation system 7;

(3.5) computing the first passive sensor location vector r1, expressed in the local navigation coordinate system, using the knowledge of the first passive sensor location L1 in the carrier body coordinate system (Xb,Yb,Zb) and navigation data from the GPS/IMU integrated navigation system 7;

(3.6) computing the second passive sensor location vector r2, expressed in the local navigation coordinate system, using the knowledge of the second passive sensor location L2 in the carrier body coordinate system (Xb,Yb,Zb) and navigation data from the GPS/IMU integrated navigation system 7;

(3.7) forming the first presumed target vector (d1+L1), expressed in the navigation coordinates, by adding the first target-sensor vector d1 and the first passive sensor location vector L1;

(3.8) forming the second presumed target vector (d2+L2) expressed in the navigation coordinates, by adding the second target-sensor vector d2 and the second passive sensor location vector L2;

(3.9) finding the first unknown distance and the second known distance, using the first presumed target vector and the second presumed target vector;

(3.10) forming the first target vector, by inserting the first known distance into the first presumed target vector;

(3.11) forming the second target vector, by inserting the second known distance into the second presumed target vector; and (3.12) forming a range vector measurement r, using the first target vector and the second target vector.

As a preferred embodiment, the step (3.9) further comprises the steps of:

(3.9.A1) forming a vector equation by differencing the first target vector and the second target vector; and (3.9.A2) finding the first unknown distance and the second unknown distance, by resolving the vector equation.

The position of each passive sensor 11 and 12 in the carrier body coordinate system (Xb, Yb, Zb) and the target can determine a straight line in the 3-dimensional space. Under ideal conditions, the intersecting point of the two straight lines is the position of the ranged target.

Referring to FIG. 3, as described above, the positions of the two passive sensors 11, 12 are represented by the coordinates $(x_1,y_1,z_1)$ and $(x_2,y_2,z_2)$ in the navigation coordinate system, respectively. The first and second passive sensor location vectors are denoted by the vectors $L_1$ and $L_2$. The two measured directions of the target are denoted by the unit vectors $1_1$ and $1_2$.

The direction of the target derived from the output of the passive sensor device can be expressed with two angles: the elevation angle $\beta$ and the azimuth angle $\alpha$, with respect to the body coordinates. So the direction of the target from each sensor device 11, 12 can be represented by a unit vector $l_i$, i=1,2.

$$l_i = \begin{bmatrix} -\cos\beta_i \cos\alpha_i \\ \cos\beta_i \sin\alpha_i \\ -\sin\beta_i \end{bmatrix}, \quad i = 1, 2 \quad (1)$$

Assume the position of the target is represented by the vector r in the carrier body coordinate system.

$$r = \begin{bmatrix} x \\ y \\ z \end{bmatrix} \quad (2)$$

The presumed target vectors that are determined by the two passive sensor respectively can be written as follows $$r = L_1 + d_1 l_1 \quad (3)$$

$$r = L_2 + d_2 l_2 \quad (4)$$

where, the variables $d_1$ or $d_2$ are the unknown distances between the passive sensors and the target. The intersecting point of the two lines can be determined by the following equation $$d_1 l_1 - d_2 l_2 = L_2 - L_1 = \Delta r_0 \quad (5)$$

which written in matrix form becomes $$\begin{pmatrix} -\cos\beta_1\cos\alpha_1 & \cos\beta_2\cos\alpha_2 \\ \cos\beta_1\sin\alpha_1 & -\cos\beta_2\sin\alpha_2 \\ -\sin\beta_1 & \sin\beta_2 \end{pmatrix} \cdot \begin{bmatrix} d_1 \\ d_2 \end{bmatrix} = \begin{bmatrix} x_2 - x_1 \\ y_2 - y_1 \\ z_2 - z_1 \end{bmatrix} \quad (6)$$

Notice that there are three equations but only two unknowns, $d_1$ and $d_2$. So it is an over-determined equation set and it is possible that there may be no definite solutions for this set of equations. Corresponding to the ranging problem, there may be no definite position for the target according to the ranging measurements. That is, the two lines which are determined by the passive sensors 11, 12 may not intersect each other.

Under ideal conditions, when there is no error in the passive/ranging/tracking system, the above equations should have a unique solution. But in a practical system, because of installation errors, processing errors, and other error sources, it is a coincidence for the tracking problem to have the two lines intersect each other. So in practical applications, it is necessary to estimate the most probable target position according to some kind of optimization principle.

To find a set of $d_1$ and $d_2$, we use the criterion that the two points at each line correspond to the shortest distance between the two lines.

The distance between the two lines depends on $d_1$ and $d_2$. If denoted by D, the distance can be expressed as $$S == \sqrt{D^2} = \sqrt{\begin{array}{l}(\Delta x - d_2\cos\beta_2\sin\alpha_2 + d_1\cos\beta_1\sin\alpha_1)^2 + \\ (\Delta y + d_2\cos\beta_2\cos\alpha_2 - d_1\cos\beta_1\cos\alpha_1)^2 + \\ (\Delta z + d_2\sin\beta_2 - d_1\sin\beta_1)^2\end{array}} \quad (7)$$

We can find $d_1$, $d_2$ to minimize S using an optimization method. The minimum of S is the shortest distance between the two tracking lines.

We can also solve Equation (7) with a least squares method, and the result is the same as the minimization method above. The solution can be expressed in the form of vector arithmetic as follows $$d_1 = \frac{1}{d_h}[l_1 \Delta r_0 - (l_1 l_2)l_2 \Delta r_0] \quad (8)$$

$$d_2 = \frac{1}{d_h}[(l_1 l_2)l_1 \Delta r_0 - l_2 \Delta r_0]$$

where $d_h = 1 - [\cos\beta_1 \cos\beta_2 \cos(\alpha_2 - \alpha_1) + \sin\beta_1 \sin\beta_2]^2$, and $l_1 \Delta r_0, l_1 l_2, l_2 \Delta r_0$ in the above equations means the dot product of two vectors.

Notice that except for the case where the two lines are parallel ($\beta_1 = \beta_2$ and $\alpha_1 = \alpha_2$) we can always obtain definite $d_1$ and $d_2$ solutions to optimize the position estimate.

Inserting Equation (8) into Equation (3) and (4), we can get the two target range vector measurements corresponding to $d_1$ and $d_2$. Averaging the two estimates, we arrive at $$r = \frac{1}{2}(r_{10} + r_{20} + d_1 l_1 + d_2 l_2) \quad (9)$$

This is the solution to the target ranging problem. The range measurement is expressed as $$R = |r| = \sqrt{x^2 + y^2 + z^2}$$

Additionally, we can obtain estimates of the orientations of the target with respect to center of the carrier:

$$\theta_v = \text{atan}\frac{z}{\sqrt{x^2 + y^2}} \quad (10)$$

$$\varphi_v = \text{atan}\frac{y}{x} \quad (11)$$

In the ideal situation, if there is no error in the passive/ranging/tracking system, the minimized S will be zero. We can use the S value as a real-time verification of the ranging error with a probabilistic interpretation.

Therefore, the step (3.9) further comprises the steps of:
(3.9.B1) forming a formula for a distance parameter, which represents the distance of the two points between the first target vector and the second target vector, using the first target vector and the second target vector; and
(3.9.B2) finding a set of the first unknown distance and the second unknown distance, which makes the value of the distance parameter be minimal.

Alternatively, the step (3.9) further comprises the steps of:
(3.9.C1) forming a vector equation by differencing the first target vector and the second target vector; and
(3.9.C2) finding the first unknown distance and the second unknown distance, by resolving the vector equation using a least squares method.

As a preferred embodiment, the step (3.12) further comprises the step of:

(3.12.A) forming a range vector measurement, averaging the first target vector and the second target vector.

At each epoch, the range vector measurement obtained from the step (3) is noisy. Therefore, the position and velocity that are extracted directly from the range vector measurement may be very noisy.

Figure 4:
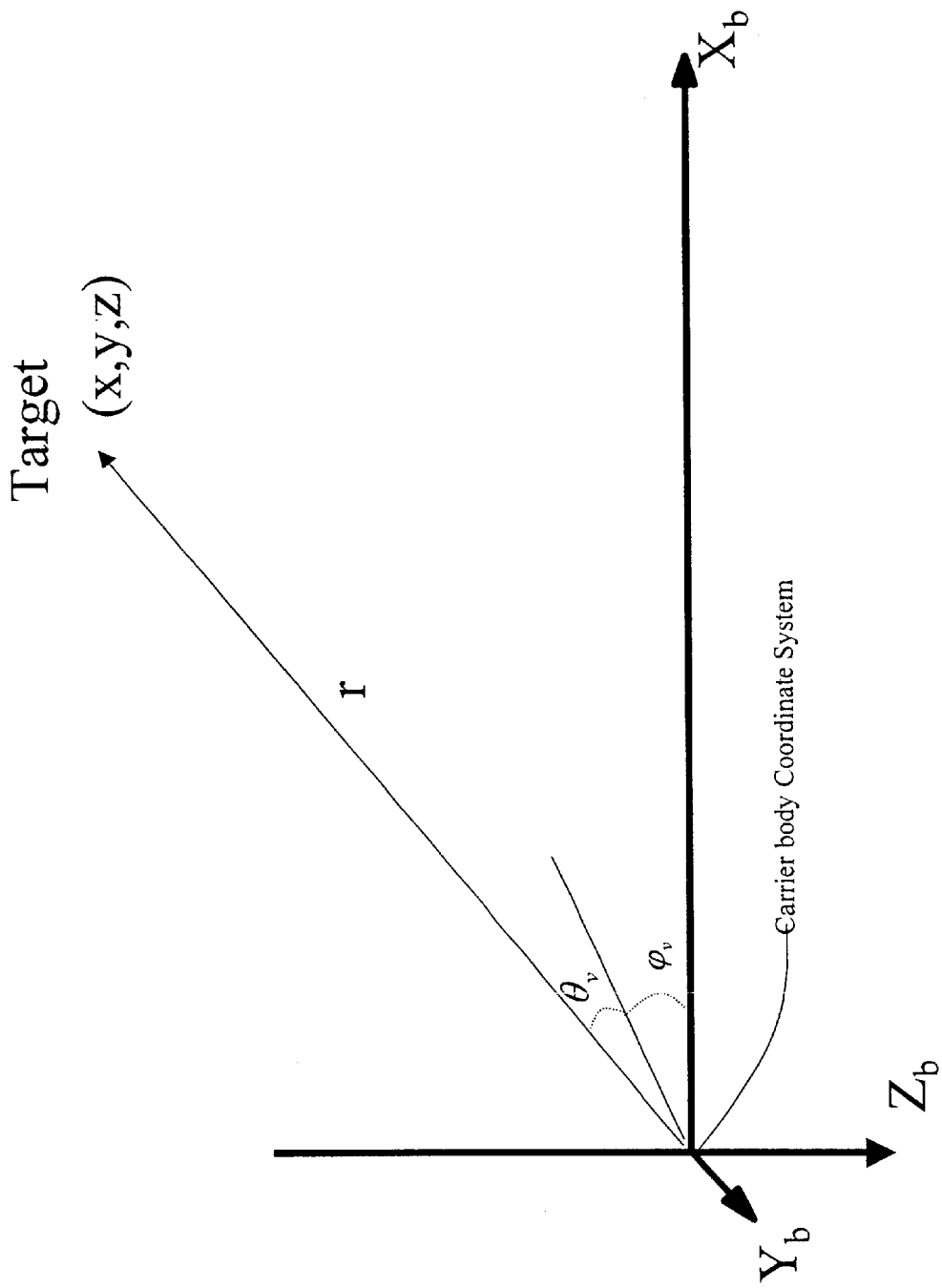
FIG. 4 shows the passive tracking coordinate system according to the above preferred embodiment of the present invention.

To obtain improved performance of the passive/ranging\tracking method of the present invention, referring to FIGS. 3 and 4, the step (4) further comprises the step of:

(4A) filtering the range vector measurement at each epoch to estimate the current position of the target by a filter at the current epoch.

The filter of the present invention is preferably chosen as a Kalman filter. Kalman filtering is a method for estimating the state variables of a dynamic system recursively from noise-contaminated measurements.

The Kalman filter of the present invention uses range vector measurements and orientation measurements to estimate the current position of the target with respect to the carrier and to further predict the future position of the target with respect to the carrier. The Kalman filtering algorithm includes estimation algorithms and prediction algorithms.

The tracking Kalman filter models the dynamics of the target as follows $$X_{k+1} = F X_k + G W_k \quad (12)$$

where, $X_K$ is the state vector at time K. F is the system matrix, G is the input matrix, and $W_k$ is a disturbance input vector. These quantities are defined below, where $Q_k$ is the disturbance matrix.

$$X_k = \begin{bmatrix} x_{1k} \\ x_{2k} \\ x_{3k} \\ x_{4k} \\ x_{5k} \\ x_{6k} \end{bmatrix} = \begin{bmatrix} x \\ \dot{x} \\ y \\ \dot{y} \\ z \\ \dot{z} \end{bmatrix}$$

$$F = \begin{bmatrix} 1 & T & 0 & 0 & 0 & 0 \\ 0 & 1 & 0 & 0 & 0 & 0 \\ 0 & 0 & 1 & T & 0 & 0 \\ 0 & 0 & 0 & 1 & 0 & 0 \\ 0 & 0 & 0 & 0 & 1 & T \\ 0 & 0 & 0 & 0 & 0 & 1 \end{bmatrix}$$

$$G = \begin{bmatrix} \frac{T^2}{2} & 0 & \\ T & 0 & \\ & \frac{T^2}{2} & \\ & T & \\ & & \frac{T^2}{2} \\ & & T \end{bmatrix} \quad W_k = \begin{bmatrix} w_x \\ w_y \\ w_z \end{bmatrix}$$

$$W_k \sim N(0, Q_k), \quad Q_k = E[w_k w_k^T] = \begin{bmatrix} q_x & 0 & 0 \\ 0 & q_y & 0 \\ 0 & 0 & q_z \end{bmatrix}$$

Where T is the sample time. Referring to FIG. 4, the measurements of the Kalman filter are the relative range, azimuth, and elevation $$r = \sqrt{x^2 + y^2 + z^2} \quad (13)$$

$$\theta_v = \alpha\tan\frac{z}{\sqrt{x^2 + y^2}} \quad (14)$$

$$\varphi_v = \alpha\tan\frac{y}{x} \quad (15)$$

$X_k$ itself is not measurable directly. Measurement equations (13), (14), and (15) can be further expressed as follows $$z(k) = h(x(k)) + v(k) \quad (16)$$

where z(k) represents the discrete measurement at the k-th sampling time $t_k$, h(x) is a vector nonlinear function which describes the relationship of the measurement with the state vector, and v(k) is the measurement noise with a variance of R(k).

Because the measurement.equation (16) is nonlinear, an extended Kalman filter is needed to estimate the current position of the target and to predict the projected trajectory of the target.

Denote $\hat{x}(k)$ and P(k) the estimate and its associated covariance error matrix obtained by the extended Kalman filter, respectively. The optimal estimation of the current position of the target is obtained in two steps as follows:

Time Propagation $$\hat{X}(k/k-1) = F\hat{X}(k/k-1) \quad (17)$$

$$P(k/k-1) = FP(k/k-1)F^T + Q_{k-1} \quad (18)$$

Measurement Update

When the measurement z(k) is available at time $t_k$, the measurement update is performed to correct the estimate and its covariance error matrix, using the standard discrete extended Kalman filter. Define the Jacobi matrix $$\left(H(k) = \frac{\partial h(x)}{\partial x}\bigg|\right)_{x=\hat{x}(k/k-1)} \quad (19)$$

The measurement update equations are:

$$\eta(k) = H(k)P(k/k-1)H^T(k) + R(k)$$

$$K(k) = P_-(k)H^T(k)\eta^{-1}(k)$$

$$\hat{x}(k) = \hat{x}(k/k-1) + K(k)[z(k) - h(\hat{x}(k/k-1))]$$

$$P(k) = [I - K(k)H(k)]P(k/k-1) \quad (20)$$

where $\hat{x}(k/k-1)$ and P(k/k-1) in (19) and (20) are the solutions of (17) and (18) evaluated at time $t_k$, just before z(k) is processed. Furthermore, the outputs of the measurement update, $\hat{x}(k)$ and P(k), provide the initial conditions for (17) and (18) starting at time $t_k$, just after z(k+1) is processed.

It can be easily seen from (17)~(20) that the cases of irregular and intermittent measurements are easily handled. When no measurement is available, only a time update is performed to produce an optimal prediction.

When $\hat{x}(k)$ at time $t_k$ is available, the projected trajectory of the target can be predicted, based on the given prediction interval $T_p$, $$\hat{X}(k+T_p/k) = F\hat{X}(k) \quad (21)$$

Generally, the predication $T_p$ is larger than the sample time T. If $T_p = T$, the prediction of the projected trajectory of the target can be included in the computation circle of the optimal estimation of the current position of the target (17)~(20).

Figure 5:
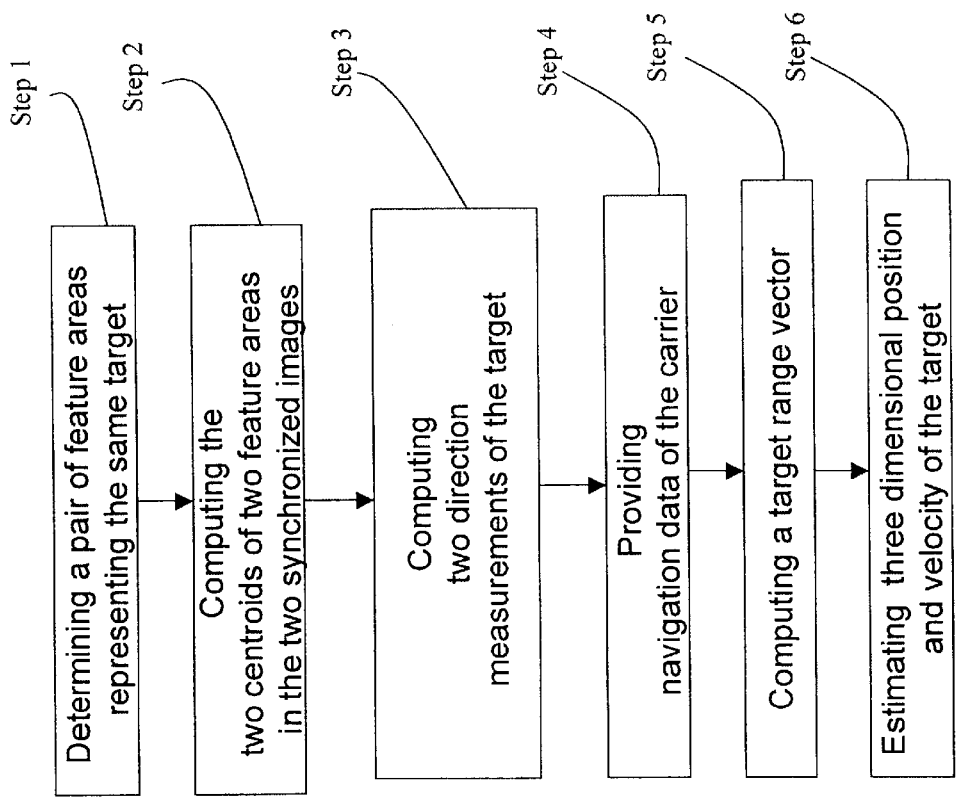
FIG. 5 is a block diagram illustrating the passive/ranging/tracking processing steps according to the two passive image sensors of the present invention.

In a preferred application of the present invention, the passive sensor 11, 12, 13 . . . of the present invention can be a passive image sensor. Passive image sensors can output image sequences. Referring to FIG. 5, the passive/ranging/tracking method comprises the steps of:

(1) determining a pair of feature areas in the two synchronized image data from the two passive image sensors, wherein the pair of feature represents the same target;

(2) computing the two centroids of the two feature areas in the two synchronized images;

(3) computing the two direction measurements, using the two centroids;

(4) producing navigation data of the carrier, including position, velocity, and attitude data, using an onboard navigation system;

(5) computing the range vector measurement of the target with respect to the carrier using the two sets of direction measurements; and (6) extracting the three-dimensional position and velocity information of the target at the current epoch using the range vector measurement;

After the centroid of the target is determined in both images, the direction measurements of the target with respect to both passive image sensors can be derived using knowledge about the relative position/orientation of the two passive image sensors and their internal parameters.

As a preferred embodiment, the step (1) further comprises the steps of:

(1A) determining a pair of feature areas in the two synchronized image data from the two passive image sensors, using a feature matching method wherein the pair of features represents the same target.

There exists a great deal of literature on feature extraction and matching. One example of a sophisticated feature matching and scene registration technique that has been successfully applied to related applications is attributed graph matching. Attributed graphs are represented by nodes and arcs where each node corresponds to a derived image feature and arcs represent the relationships between nodes.

Figure 6:
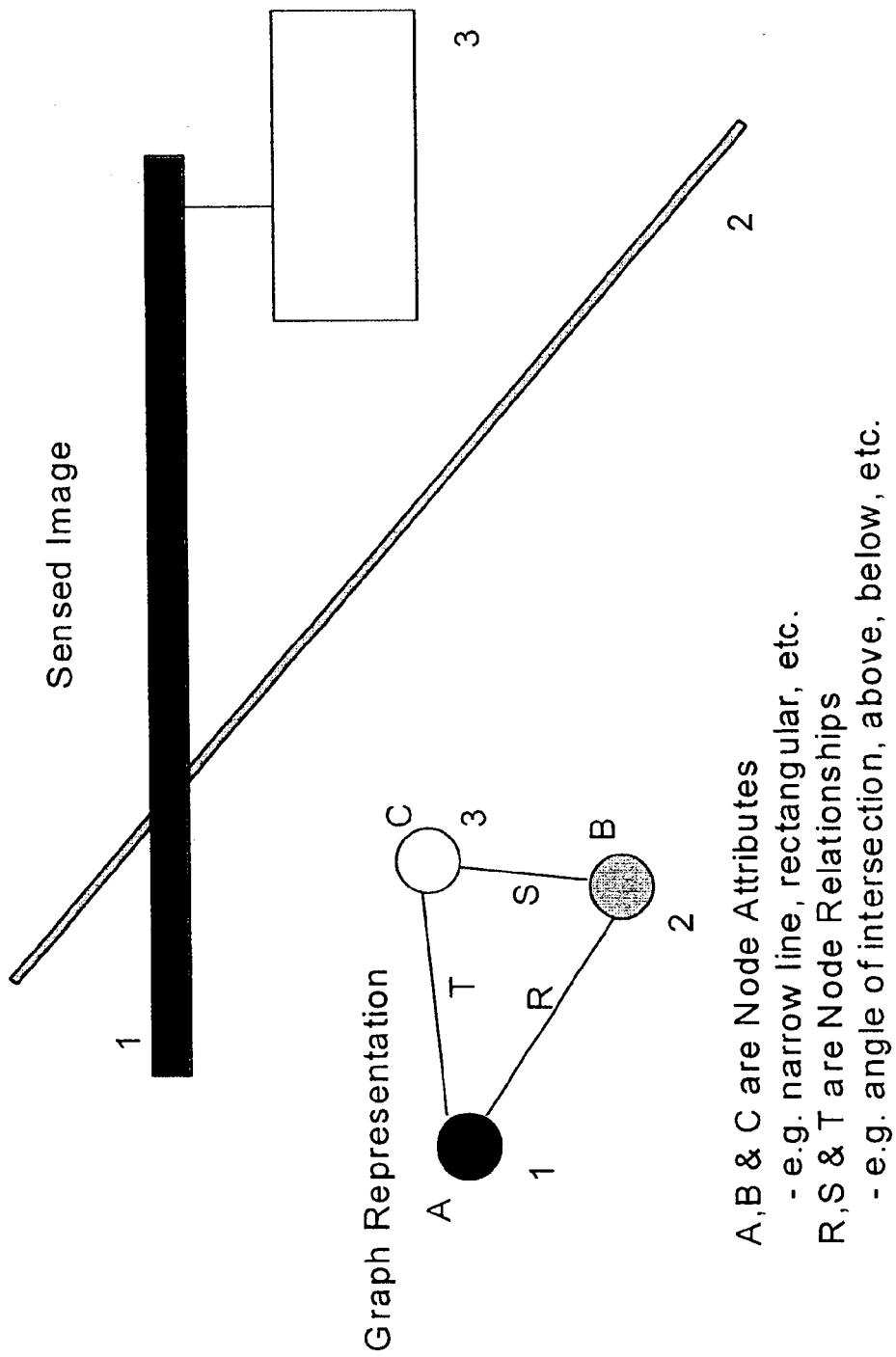
FIG. 6 shows the attributed graph representation according to the above preferred embodiment of the present invention.

For example, in FIG. 6, a sensed image consists of three objects (1,2,3) containing certain spatial relationships and attributes (size, thickness, texture). An attributed graph can be formed from these three detected features as shown in FIG. 6.

The nodes of the graph correspond to the three individual detected features and the relations between nodes correspond to their angles of intersection or spatial relationships (above, to the right of, etc.). Nodes also contain attributes such as the size, thickness or texture associated with the detected image features. Attributed graph representation derived from imagery obtained from the passive image sensors; the three detected objects or image features 1, 2 and 3 are used to create or synthesize an attributed graph representation of the sensed scene; this sensed graph is then matched with store reference graphs.

The basic matching process requires the creation of a reference attributed graph from available sources (example, information regarding the manned vehicle) and the synthesis of a sensed attributed graph from the live sensor imagery. These comparable representations are then matched using a specialized search algorithm.

Figure 7:
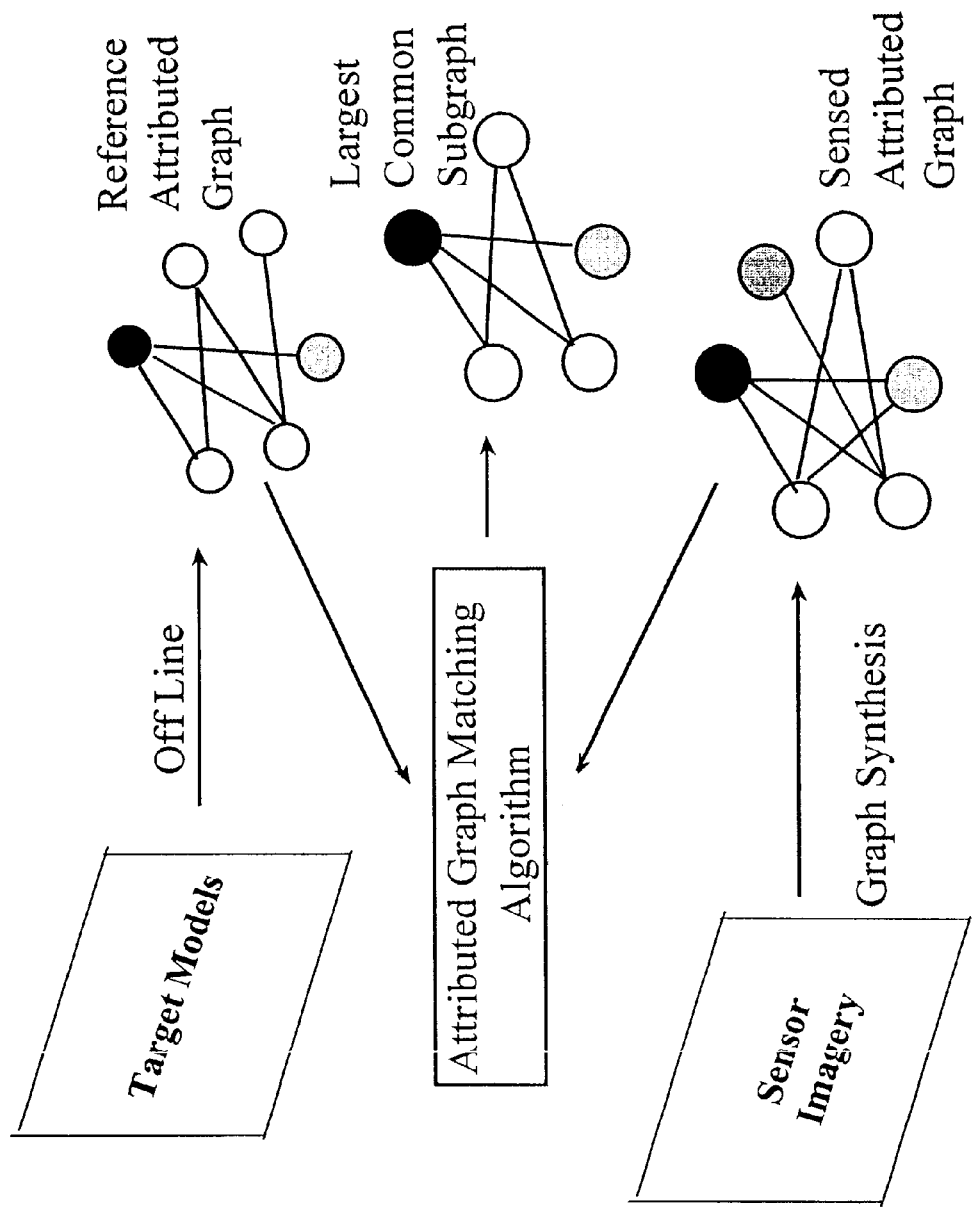
FIG. 7 shows the feature matching algorithm according to the above preferred embodiment of the present invention.

The matching or graph registration procedure is shown in FIG. 7. The output of the attributed graph matching algorithm is the largest common subgraph which represents the degree of matching between the reference and sensed data. The number of nodes and arcs in the output attributed graph can be used to assess the match quality, based on the number of nodes and arcs matched, and the uniqueness of their corresponding attributes.

The target models are used to form reference graphs that are input to the matching process (off line); the live imagery derived from the stereo sensors is synthesized into sensed attributed graphs; finally, the two graph representations (reference and sensed) are matched using a specialized matching algorithm. The output is the largest common subgraph and represents the registration of the reference and sensed data.

The attributed graph matching algorithm as shown in FIG. 7 uses a branch and bound technique to rapidly match the sensed and reference graphs. The process is mathematically a polynomial time algorithm. However, the attributes of the nodes and arcs in the graph collapse the search space and the registration can be easily performed in real time. The time consuming portion of the process is the feature extraction step where pixel data is processed to detect the objects in the sensed scene.

The features of using this type of approach include:
(i) Sensor independent feature representation,
(ii) Tolerant to perspective variations,
(iii) Attributed nodes and relationships
(iv) Incorporate camera parameters when available,
(v) Represent spacecraft features, and
(vi) Prior experience on related programs.

The benefits-of using this type of approach include:
(i) Same technique can be applied to Visible/IR data,
(ii) Register wider range of data,
(iii) Constrains search for improved matching and low false alarms,
(iv) Improves search and matching accuracy.
(v) Flexible integration of diverse reference data sources, and
(vi) Lower risk approach.

As another preferred embodiment, the step (1) alternatively comprises the steps of:
(1B.1) detecting a moving target in both images from at least two passive image sensors; and
(1B.2) determining a pair of feature areas in the two synchronized image data from the two passive image sensors, using a feature matching method wherein the pair of features represents the same target.

Alternatively, the passive image sensor can be a visible/infrared (IR) camera. Therefore, the two passive image sensors can be externally synchronized with GPS's precise timer signal, so that they capture images simultaneously and the data in both images are directly related.

As a preferred embodiment of the present invention, the two passive sensors can also be installed on two individual carriers to range and track a target passively. Then, the passive/ranging/tracking method performed in two individual carriers comprises the steps of:

(1) producing two or more sets of direction measurements of the target with respect to at least a first carrier and a second carrier, such as sets of elevation and azimuth angle of the target, from two or more synchronized sets of passive sensors through associated tracking control device, wherein the two passive sensors are installed on the first carrier and second carrier respectively;

(2) producing navigation data of the first carrier and the second carrier, including position, velocity, and attitude data, using the first onboard navigation system on the first carrier and the second onboard navigation system on the second carrier, (3) computing the target range vector measurement of the target with respect to each of the first carrier and the second carrier, using the two or more sets of direction measurements, wherein the first carrier and the second carrier are data-linked; and (4) extracting the three-dimensional position and velocity information of the target, expressed in the navigation coordinate system, at the current epoch using the target range vector measurement.

Alternatively, it is apparent that the carrier(s) can be in static condition or the two or more passive sensors can be directly located on the ground, i.e. the carrier can be the earth, according to the present invention. These passive sensors on the different locations on the ground are data-linked to implement the passive/ranging/tracking of a target.

What is claimed is:

1. A passive ranging and tracking method for tracking a target, comprising the steps of:

(a) producing at least a first set of direction measurements and a second set of direction measurements of the target with respect to a carrier from at least a first passive sensor and a second passive sensor through at least a first tracking control device and a second tracking control device respectively, wherein said first and second passive sensors are installed on said carrier and each of said first and second passive sensors is controlled by said respective tracking control device to keep pointing to said target;

(b) producing navigation data of said carrier, including position, velocity, and attitude data, using an onboard navigation system;

(c) computing a target range vector measurement of said target with respect to said carrier using said two first set and second set of direction measurements, wherein the step (c) further comprises the steps of:

(c.1) forming a first presumed target-sensor vector, representing a direction measurement between said first passive sensor and said target, expressed in a first passive sensor coordinate system, using a first elevation angle and azimuth angle measurement of said target from an output of said first passive sensor and a first unknown distance formed between said first passive sensor and said target;

(c.2) forming a second presumed target-sensor vector, representing a direction measurement between said second passive sensor and said target, expressed in a second passive sensor coordinate system, using a second elevation angle and azimuth angle measurement of said target from an output of said second passive sensor and a second unknown distance formed between said second passive sensor and said target;

(c.3) converting said first presumed target-sensor vector from said first passive sensor coordinate system to a navigation coordinate system of said carrier, using navigation data from a GPS/IMU integrated navigation system which provides position and attitude information of said carrier;

(c.4) converting said second presumed target-sensor vector from said second passive sensor coordinate system to said navigation coordinate system of said carrier, using said navigation data from said GPS/IMU integrated navigation system;

(c.5) computing said first passive sensor location vector, expressed in a local navigation coordinate system, using knowledge of a first passive sensor location in a carrier body coordinate system and said navigation data from said GPS/IMU integrated navigation system;

(c.6) computing said second passive sensor location vector, expressed in said local navigation coordinate system, using knowledge of a second passive sensor location in said carrier body coordinate system and said navigation data from said GPS/IMU integrated navigation system;.

(c.7) forming a first presumed target vector, expressed in navigation coordinates, by adding said first target-sensor vector and said first passive sensor location vector;

(c.8) forming a second presumed target vector expressed in said navigation coordinates, by adding said second target-sensor vector and said second passive sensor location vector;

(c.9) finding said first unknown distance and said second unknown distance, using said first presumed target vector and said second presumed target vector;

(c.10) forming a first target vector, by inserting said first unknown distance into said first presumed target vector;

(c.11) forming a second target vector, by inserting said second unknown distance into said second presumed target vector; and (c.12) forming a range vector measurement, using said first target vector and said second target vector; and (d) extracting three-dimensional position and velocity information of said target at a current epoch using said target range vector measurement.

2. The passive ranging and tracking method, as recited in claim 1, wherein the step (c.9) further comprises the steps of:

(c.9.A1) forming a vector equation by differencing said first target vector and said second target vector; and (c.9.A2) finding said first unknown distance and said second unknown distance, by resolving said vector equation, thereby a first position of said first passive sensors in said carrier body coordinate system and said target determine a first straight line in a 3-dimensional space and a second position of said second passive sensors in said carrier body coordinate system and said target determine a second straight line in said 3-dimensional space, so that an intersecting point of said first and second straight lines is a ranged position of said target.

3. The passive ranging and tracking method, as recited in claim 1, wherein the step (c.9) further comprises the steps of:

(c.9.B1) forming a formula for a distance parameter, which represents a distance of two points between said first target vector and said second target vector, using said first target vector and said second target vector; and (c.9.B2) finding a set of said first unknown distance and said second unknown distance, which makes a value of said distance parameter be minimal.

4. The passive ranging and tracking method, as recited in claim 1, wherein the step (c.9) further comprises the steps of:

(c.9.C1) forming a vector equation by differencing said first target vector and said second target vector; and (c.9.C2) finding said first unknown distance and said second unknown distance, by resolving said vector equation using a least squares method.

5. The passive ranging and tracking method, as recited in claim 1, wherein the step (d) further comprises a step of filtering said range vector measurement at each epoch to estimate a current position of said target by a filter at said current epoch.

6. The passive ranging and tracking method, as recited in claim 2, wherein the step (d) further comprises a step of filtering said range vector measurement at each epoch to estimate a current position of said target by a filter at said current epoch.

7. The passive ranging and tracking method, as recited in claim 3, wherein the step (d) further comprises a step of filtering said range vector measurement at each epoch to estimate a current position of said target by a filter at said current epoch.

8. The passive ranging and tracking method, as recited in claim 4, wherein the step (d) further comprises a step of filtering said range vector measurement at each epoch to estimate a current position of said target by a filter at said current epoch.

9. A passive ranging and tracking method for tracking a target, comprising the steps of:

(a) producing at least a first set of direction measurements and a second set of direction measurements of the target with respect to at least a first carrier and a second carrier from at least a first passive sensor and a second passive sensor through at least a first tracking control device and a second tracking control device respectively, wherein said first and second passive sensors and said first and second tracking control devices are installed on said carriers respectively and each of said first and second passive sensors is controlled by said respective tracking control device to keep pointing to said target;

(b) producing navigation data of said first and second carriers, including position, velocity, and attitude data, using a first onboard navigation system provided on said first carrier and a second onboard navigation system on said second carrier;

(c) computing a target range vector measurement of said target with respect to each of said carriers, using said two or more sets of direction measurements, wherein said first carrier and said second carrier are data-linked, wherein the step (c) further comprises the steps of:

(c.1) forming a first presumed target-sensor vector, representing a direction measurement between said first passive sensor and said target, expressed in a first passive sensor coordinate system, using a first elevation angle and azimuth angle measurement of said target from an output of said first passive sensor and a first unknown distance formed between said first passive sensor and said target;

(c.2) forming a second presumed target-sensor vector, representing a direction measurement between said second passive sensor and said target, expressed in a second passive sensor coordinate system, using a second elevation angle and azimuth angle measurement of said target from an output of said second passive sensor and a second unknown distance formed between said second passive sensor and said target;

(c.3) converting said first presumed target-sensor vector from said first passive sensor coordinate system to a first navigation coordinate system of said first carrier, using first navigation data from a GPS/IMU integrated navigation system which provides position and attitude information of said first carrier;

(c.4) converting said second presumed target-sensor vector from said second passive sensor coordinate system to a second navigation coordinate system of said second carrier, using said second navigation data from said GPS/IMU integrated navigation system which provides position and attitude information of said second carrier;

(c.5) computing a first passive sensor location vector, expressed in a first local navigation coordinate system, using knowledge of a first passive sensor location in a first carrier body coordinate system and said first navigation data from said GPS/IMU integrated navigation system;

(c.6) computing a second passive sensor location vector, expressed in a second local navigation coordinate system, using knowledge of a second passive sensor location in a second carrier body coordinate system and said second navigation data from said GPS/IMU integrated navigation system;

(c.7) forming a first presumed target vector, expressed in navigation coordinates, by adding said first target-sensor vector and said first passive sensor location vector;

(c.8) forming a second presumed target vector expressed in said navigation coordinates, by adding said second target-sensor vector and said second passive sensor location vector;

(c.9) finding said first unknown distance and said second unknown distance, using said first presumed target vector and said second presumed target vector;

(c.10) forming a first target vector, by inserting said first unknown distance into said first presumed target vector;

(c.11) forming a second target vector, by inserting said second known distance into said second presumed target vector; and (c.12) forming a range vector measurement, using said first target vector and said second target vector; and (d) extracting three-dimensional position and velocity information of said target, expressed in a navigation coordinate system, at a current epoch using said target range vector measurement.

10. The passive ranging and tracking method, as recited in claim 9, wherein the step (c.9) further comprises the steps of:

(c.9.A1) forming a vector equation by differencing said first target vector and said second target vector; and (c.9.A2) finding said first unknown distance and said second unknown distance, by resolving said vector equation, thereby a first position of said first passive sensors in said first carrier body coordinate system and said target determine a first straight line in a 3-dimensional space and a second position of said second passive sensors in said second carrier body coordinate system and said target determine a second straight line in said 3-dimensional space, so that an intersecting point of said first and second straight lines is a ranged position of said target.

11. The passive ranging and tracking method, as recited in claim 9, wherein the step (c.9) further comprises the steps of:

(c.9.B1) forming a formula for a distance parameter, which represents a distance of two points between said first target vector and said second target vector, using said first target vector and said second target vector; and (c.9.B2) finding a set of said first unknown distance and said second unknown distance, which makes a value of said distance parameter be minimal.

12. The passive ranging and tracking method, as recited in claim 9, wherein the step (c.9) further comprises the steps of:

(c.9.C1) forming a vector equation by differencing said first target vector and said second target vector; and (c.9.C2) finding said first unknown distance and said second unknown distance, by resolving said vector equation using a least squares method.

13. The passive ranging and tracking method, as recited in claim 9, wherein the step (d) further comprises a step of filtering said range vector measurement at each epoch to estimate a current position of said target by a filter at said current epoch.

14. The passive ranging and tracking method, as recited in claim 10, wherein the step (d) further comprises a step of filtering said range vector measurement at each epoch to estimate a current position of said target by a filter at said current epoch.

15. The passive ranging and tracking method, as recited in claim 11, wherein, the step (d) further comprises a step of filtering said range vector measurement at each epoch to estimate a current position of said target by a filter at said current epoch.

16. The passive ranging and tracking method, as recited in claim 12, wherein the step (d) further comprises a step of filtering said range vector measurement at each epoch to estimate a current position of said target by a filter at said current epoch.

17. The passive ranging and tracking method, as recited in claim 9, wherein each of said first and second passive sensors is a passive image sensor and the step (a) comprises the steps of:

(a.1) determining at least a first and a second feature area in at least two synchronized image data from said first and second passive image sensors, wherein said pair of features represents said target;

(a.2) computing a centroid for each of said feature areas in each of said synchronized images; and (a.3) computing said direction measurements, using said centroids.

18. The passive ranging and tracking method, as recited in claim 17, wherein, in the step (a.1), said feature areas are determined by a feature matching method.

19. The passive ranging and tracking method, as recited in claim 18, wherein said feature matching method is an attributed graph matching, wherein attributed graphs are represented by nodes and arcs where each of said nodes corresponds to a derived image feature and arcs represent relationships between said nodes.

20. The passive ranging and tracking method, as recited in claim 17, wherein before the step (a.1), further comprises a step of detecting said moving target in both images from said passive image sensors.

21. The passive ranging and tracking method, as recited in claim 17, wherein each of said passive image sensors is a visible/infrared camera, wherein said passive image sensors are externally synchronized with GPS timer signals, therefore said visible/infrared cameras capture image simultaneously and said synchronized image data are directly related.

* * * * *